(12) United States Patent
Bucholtz et al.

(10) Patent No.: US 6,513,800 B1
(45) Date of Patent: Feb. 4, 2003

(54) MECHANICAL DOUBLE ACTING SHOCK ISOLATOR

(75) Inventors: Brian Charles Bucholtz, Lakeview, NY (US); Daniel Charles Radice, Eden, NY (US); Scott Joseph Tokasz, Orchard Park, NY (US)

(73) Assignee: Enidine Inc., Orchard Park, NY (US)

( * ) Notice: Subject to any disclaimer, the term of this patent is extended or adjusted under 35 U.S.C. 154(b) by 0 days.

(21) Appl. No.: 09/902,043

(22) Filed: Jul. 10, 2001

(51) Int. Cl.[7] .................. B60G 13/00; B60G 15/00; F16F 11/00; F16F 7/00; F16F 9/00
(52) U.S. Cl. .................. 267/205; 267/135; 267/134
(58) Field of Search .................. 267/196, 199, 267/201, 205, 206, 207, 221, 34, 186, 190, 135, 136, 204, 150, 134; 188/129, 136

(56) References Cited

U.S. PATENT DOCUMENTS

| 1,170,146 A | * | 2/1916 | Gallagher | 213/29 |
|---|---|---|---|---|
| 1,501,220 A | * | 7/1924 | Kreissig | 267/204 |
| 1,689,662 A | * | 10/1928 | Bell et al. | 267/4 |
| 2,948,526 A | * | 8/1960 | Maier | 267/135 |
| 3,059,727 A | * | 10/1962 | Fuchs | 188/381 |
| 3,191,923 A | * | 6/1965 | Peter et al. | 267/207 |
| 4,254,837 A | * | 3/1981 | Jones | 175/321 |
| 4,260,142 A | * | 4/1981 | Stiefel et al. | 267/204 |
| 4,262,887 A | * | 4/1981 | Jansen | 213/29 |
| 4,262,888 A | * | 4/1981 | Jansen et al. | 267/204 |
| 4,428,565 A | * | 1/1984 | Stiefel et al. | 188/322.22 |
| 5,083,755 A | * | 1/1992 | Nenkov et al. | 175/321 |
| 5,971,374 A | | 10/1999 | Freeman | |
| 6,244,577 B1 | * | 6/2001 | Bucholtz | 267/134 |

* cited by examiner

Primary Examiner—Christopher P. Schwartz
Assistant Examiner—Devon Kramer
(74) Attorney, Agent, or Firm—Wall Marjama & Bilinski LLP

(57) ABSTRACT

A double acting mechanical shock isolator that includes a stack of friction springs contained within a housing. The stack is retained between the end walls of the housing by a pair of opposed slides. A sleeve passes through the stack and the ends of the sleeve are contained within opposing slides. The ends of the sleeve are connected to the slides by lost motion devices so that the sleeve is engaged by one of the containing slides when the sleeve moves toward the opposing slide and releases the slide when the sleeve moves in the opposite direction so that the stack is loaded in compression when the sleeve is moved axially in either direction.

13 Claims, 3 Drawing Sheets

MECHANICAL DOUBLE ACTING SHOCK ISOLATOR

FIELD OF THE INVENTION

This invention relates generally to an improved mechanical double acting shock isolator for supporting and isolating a body from a multi-acting force.

BACKGROUND OF THE INVENTION

Many vibration or shock sensitive pieces of equipment must be protected from earthquakes and other similar types of events that produce random shock waves in order to insure the operability of the equipment. Shock absorbers have been devised for this purpose, however, for the most part these devices rely on fluids for their shock absorbing properties. Furthermore, these double acting fluid shock absorbers are generally extremely complex in nature and will, over time, develop seal leaks which, of course, will adversely effect performance and eventual failure of the device. Mechanical shock isolators are also known in the art which rely on various spring arrangements for their energy absorbing properties. The mechanical spring equipped devices generally are unidirectional in nature and do not lend themselves to use in multi-directional shock absorbers or isolators where the spring must respond uniformly to both compressive and tensile forces.

SUMMARY OF THE INVENTION

It is therefore an object of the present invention to improve mechanical double acting shock isolators.

It is a further object of the present invention to simplify the design of a mechanical double acting shock isolator.

It is still a further object of the present invention to reduce the number of component parts needed to construct a double acting mechanical shock isolator.

Another object of the present invention is to increase the operating life and reliability of double acting mechanical shock isolators These and other objects of the present invention are attained by a double acting mechanical shock isolator that includes a cylindrical housing that is closed at each end by a pair of end walls. A stack of friction springs is mounted within the housing between a pair of tubular slides. When the friction spring stack is in a neutral position, the slides are held in contact against the end walls of the housing. A sleeve passes through the stack and each end of the sleeve is contained within one of the tubular slides. One end of the sleeve is further secured to a shaft that passes out of the housing through an adjacent end wall. Each slide is connected to the sleeve by a lost motion device that engages the overlying slide when the sleeve is moved axially toward the opposing slide and releases the slide when the sleeve is moved in the opposite direction. In practice, the housing can be held stationary while an axial load is applied to the shaft, or the housing is attached to the load and the shaft is held stationary. Either a tensile or compressive load applied to the shaft will cause the friction spring stack to compress uniformly in either direction.

BRIEF DESCRIPTION OF THE DRAWING

For a better understanding of these and other objects of the present invention, reference will be made to the following detailed description of the invention which is to be read in connection with the accompanying drawing, wherein.

DETAILED DESCRIPTION OF THE INVENTION

Figure 1:
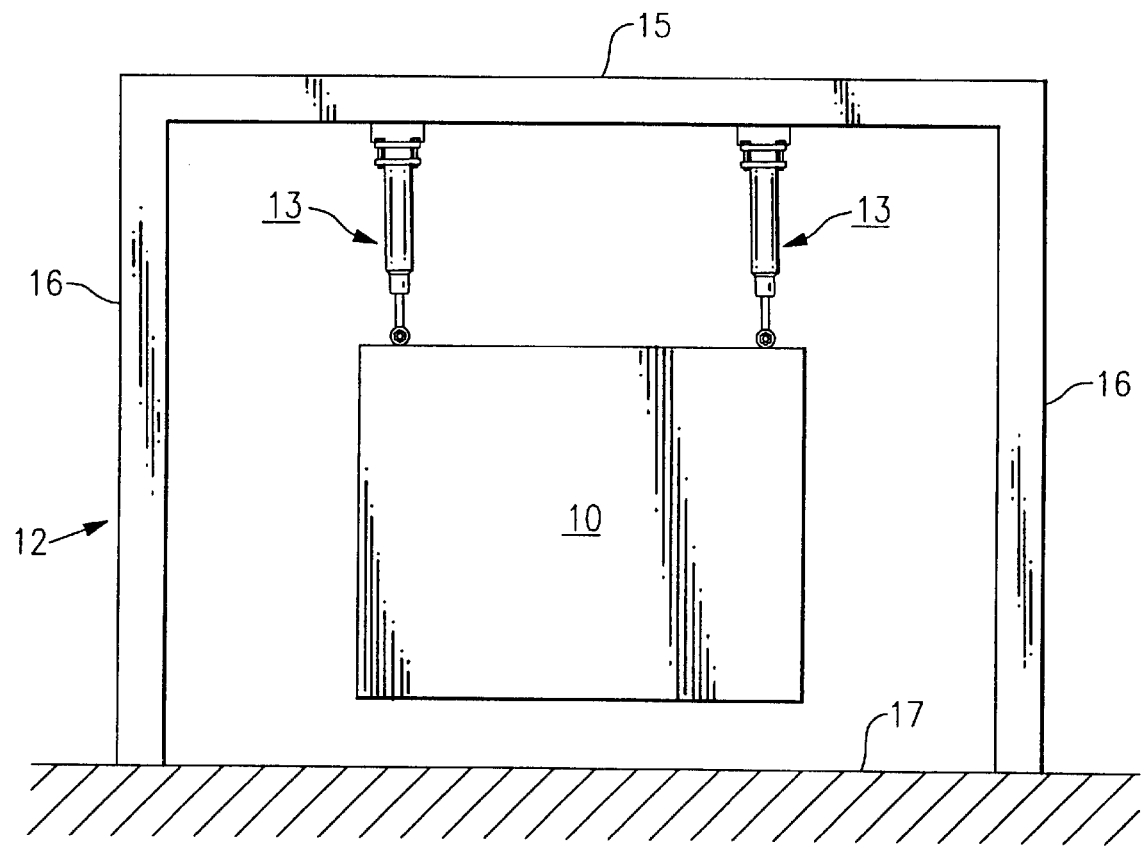
FIG. 1 is a schematic representation showing the shock isolator of the present invention being used to mount a shock or vibratory sensitive instrument to a support structure.

Turning initially to FIG. 1, there is illustrated a shock sensitive instrument, such as a computer 10, suspended within a support frame 12 by means of a plurality of double acting mechanical shock isolators, generally referenced 13, that embody the teachings of the present invention. The frame contains a cross beam 15 that is supported upon a pair of side members 16 which, in turn, are anchored in a substrate 17. In a typical application, the instrument may be situated at a remote location and, as such, will not be serviced for long periods of time. As will become evident from the disclosure below, the present double acting shock isolator contains a minimum number of parts that coact to provide maximum protection against externally induced shock forces. It should be further noted that the present device does not utilize fluids of any kind so that leaking seals or the like do not pose a problem and, as such, can operate for long periods of time unattended at remote locations.

Figure 5:
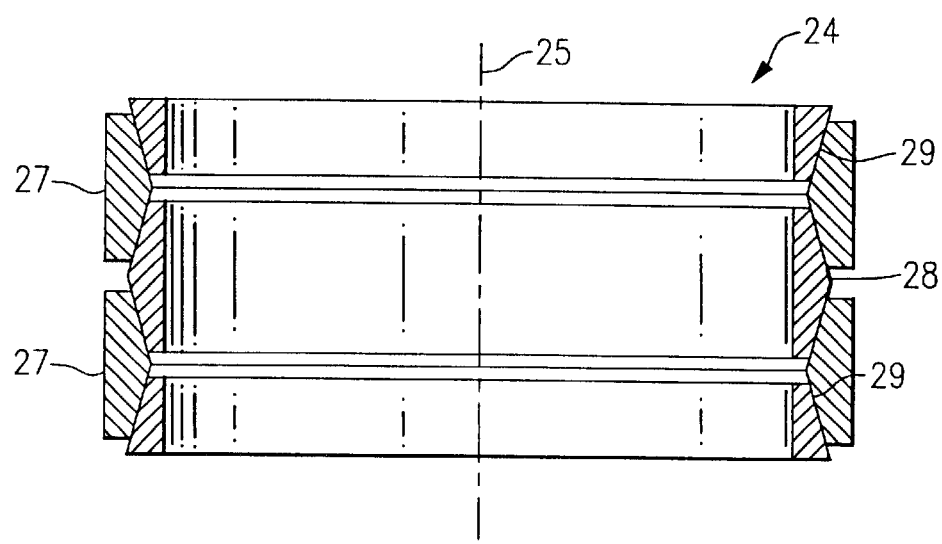
FIG. 5 is an enlarged partial view illustrating a portion of the friction spring tack employed in the present invention.
Figure 2:
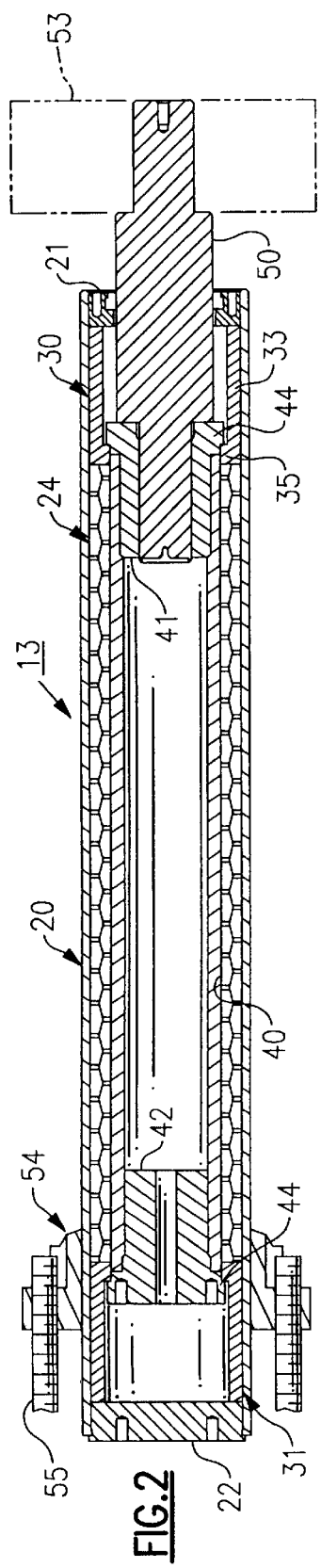
FIG. 2 is a side elevation in section illustrating the present shock isolator in a neutral position.
Figure 3:
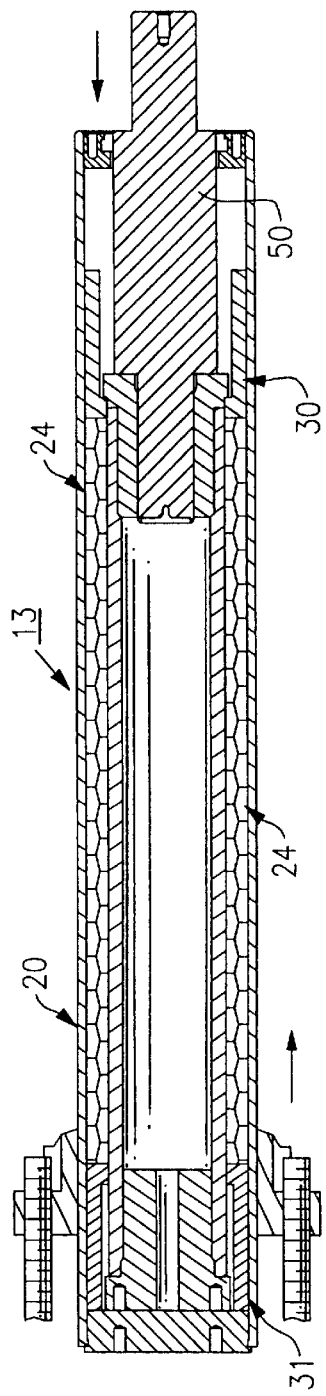
FIG. 3 is a side elevation similar to that of FIG. 2 showing the reaction of the present shock isolator when placed under a compressive load.
Figure 4:
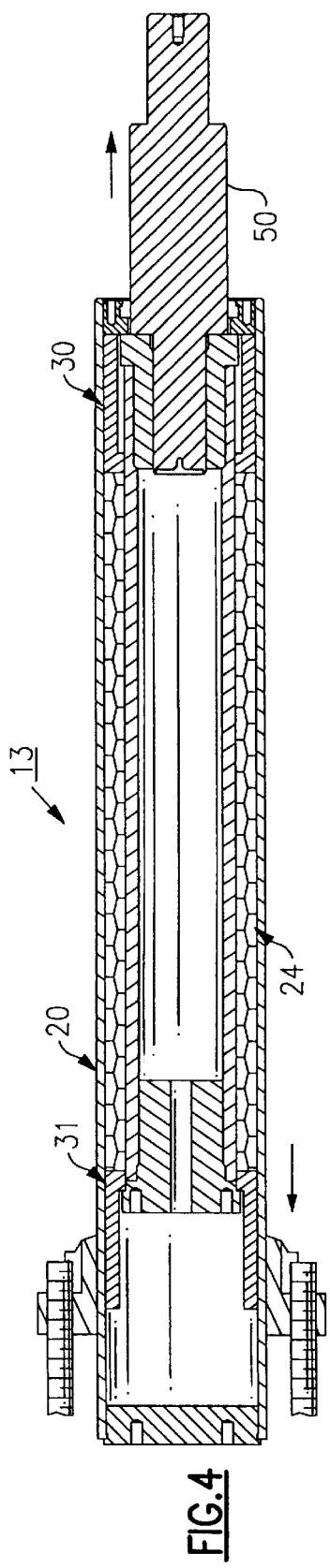
FIG. 4 is a view similar to FIG. 2 showing the reaction of the present shock isolator when placed under a tensile load.

With further reference to FIGS. 2–4, the isolator 13 of the present invention includes a cylindrical housing 20 that is closed at its distal end by a distal end wall 21 and at the proximal end by a second proximal end wall 22. A stack 24 of friction springs is mounted within the housing and the stack is aligned along the central axis 25 of the housing. Friction spring stacks of this type are commercially available through the Ringfeder Corporation having a place of business at Westwood, N.J. As illustrated in FIG. 5, the stack 24 includes a series of outer rings 27 and a series of inner rings 28. Each ring is provided with mating inclined surfaces 29 such that the surfaces of the inner rings ride in friction contact against those of the outer rings. Placing the stack in compression causes the rings to ride over each other along the inclined surfaces, thus producing a resistance to the compressive load. When the load is released the rings return to the neutral starting position as illustrated in FIG. 2.

The stack of friction springs is positioned within the housing between two tubular slides 30 and 31 that are of similar construction. Each slide possesses an annular body section 33 and an inwardly disposed flange 35 at one end that faces the friction spring stack. When the stack is in the neutral position, as illustrated in FIG. 2, each slide is held in contact against an adjacent end wall of the housing.

A cylindrical sleeve 40 is passed through the friction spring stack so that the ends of the sleeve are contained within each of the tubular slides. Here again, the sleeve is aligned along the central axis 25 of the housing. The ends of the sleeve are provided with end caps 41 and 42, each of which contains a radially disposed flange 44 that is also situated inside the overlying slide. When the friction ring stack is in the neutral position as illustrated in FIG. 2, the outwardly disposed flanges 44 of both slides are positioned immediately adjacent to the inwardly directed end flanges 35 of the slide members.

A shaft 50 is secured by any suitable means to the distal end of the sleeve and passes out of the housing through end wall 21. The free end of the shaft is provided with a coupling 53 by which the shaft can be connected to a suitable load. The housing has an annular connector 54 secured thereto that permits the housing to be coupled to a stationary support by means of mounting bolts 55. Loading the distal end of the shaft in compression causes the sleeve to move to the left as viewed in FIG. 3. This, in turn, forces the slide 30 to move axially to the left under the influence of the two interlocked flanges 44 and 35. The opposite end of the friction spring stack, however, cannot move in this direction because slide 31 is now seated against the proximal end wall 22. As a result, the friction spring stack is compressed, thus absorbing the compressive load in the form of heat which is ultimately dissipated into the surrounding ambient through the wall of the housing. Each slide is of sufficient length to allow the stack to be fully compressed in either direction. Preferably, the housing is fabricated of a metal having a high coefficient of heat transfer so that the heat of friction stored in the rings is quickly dissipated to the surrounding ambient through the housing wall.

In the event the shaft is loaded axially in tension as illustrated in FIG. 4, the slide 31 is now caused to move axially to the right. The opposing slide 30, at this time, prevents the opposite end of the stack from moving to the right and, here again, the friction spring stack is loaded in compression to absorb the tensile load.

Figure 6:
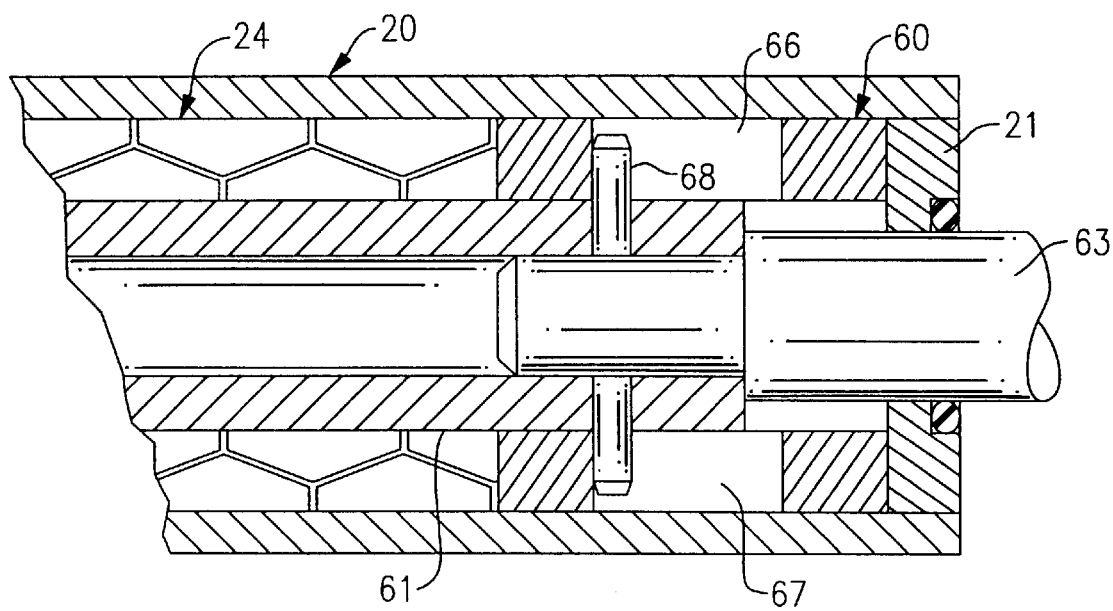
FIG. 6 is a partial side elevation in section showing a further embodiment of the invention.

FIG. 6 illustrates a further embodiment of the invention wherein each slide 60 is simply a tubular member without an end flange. The two ends of the sleeve 61 are contained within the opposed slides. One end of the sleeve, in turn, is secured to a shaft 63 that passes out of the housing 20 through the housing distal end wall 21. A pair of opposed elongated slots 66 and 67 are provided in the wall of each sleeve and a pin 68 is secured in the sleeve so that each end of the pin is captured within one of the opposed slots. As should be evident, the pin will function to move one of the slides toward the opposite slide when the shaft is loaded in either tension or compression and the pin in the opposing slide will be free to move along the slots, thus allowing the sleeve to move axially within the opposing sleeve as the friction spring stack is being compressed.

As should be clear from the disclosure above, the double acting shock isolator of the present invention contains a minimum number of component parts and as a consequence, can be economically manufactured and assembled. The shock isolator of the present invention exhibits long operating life and high reliability when compared to other similar devices known and used in the art.

While the present invention has been particularly shown and described with reference to the preferred mode as illustrated in the drawing, it will be understood by one skilled in the art that various changes in detail may be effected therein without departing from the spirit and scope of the invention as defined by the claims.

What is claimed is:

1. A double acting mechanical shock isolator that includes:
    a housing having a central axis and being closed at each end by first and second end walls;
    a stack of friction springs mounted within the housing that is coaxially aligned with said axis;
    a pair of opposed tubular slides, each slide being mounted inside said housing between one end of the stack and an adjacent end wall of the housing when the stack is in a neutral position;
    a sleeve that is fully contained within said housing and which passes through said stack, one end of the sleeve being movably contained within a first slide and the other end of the sleeve being movably contained within a second slide; and
    an actuating means acting between each end of the sleeve and one of the slides when the sleeve is moved axially toward the opposite slide and releasing said one slide when the sleeve is moved axially in the opposite direction whereby the friction spring stack is compressed when the sleeve moves axially in either direction.

2. The shock isolator of claim 1 wherein said housing is a cylinder.

3. The shock isolator of claim 1 wherein each actuator means includes a first radially extended flange mounted upon the sleeve which is arranged to move into and out of contact with a second flange mounted upon one of said slides.

4. The shock isolator of claim 1 wherein each actuating means includes a radially disposed pin mounted in one end of said sleeve and said pin being slidably contained within an elongated slot axially disposed in said slide.

5. The shock isolator of claim 1 that further includes a shaft having one end that is connected to the sleeve, and an opposite end that passes out of the housing through one end wall thereof.

6. The shock isolator of claim 5 wherein said free end of said shaft contains a connector for coupling the shaft to a load or stationary member.

7. The shock isolator of claim 6 that further includes a retaining means for connecting the housing to a stationary member or load.

8. A double acting mechanical shock isolator that includes:
    a housing that is closed at each end by first and second end walls,
    a stack of friction springs mounted within said housing along a central axis of the housing;
    a pair of opposed tubular slides mounted at either end of said stack so that the distal end of each slide contacts one end of the stack and the proximal end of each slide rests in contact with an end wall of the housing when the stack is in a neutral position;
    each slide having an inwardly disposed distal end flange at its distal end; and an elongated sleeve that passes through the stack so that each end of the sleeve is contained within one of the slides, said sleeve having an outwardly disposed flange at each end that is also contained within one of the slides and which is capable of engaging the distal end flange of the containing slide when the sleeve is moved axially toward the opposite slide and releasing the distal end flange when the sleeve is moved in the opposite direction whereby the friction spring stack is compressed when the sleeve moves axially in either direction.

9. The shock isolator of claim 8 wherein said sleeve is a tube that is closed at each end by an end cap and wherein said outwardly disposed flanges are mounted upon said end caps.

10. The shock isolator of claim 8 that further includes a shaft having one end connected to said sleeve and an opposite end passing out of the housing through one of said end walls.

11. The shock isolator of claim 8 wherein said housing is an elongated cylinder.

12. The shock isolator of claim 10 wherein said opposite end of said shaft contains a connector for coupling the shaft to a load or a stationary member.

13. The shock isolator of claim 12 that further includes a retaining means for mounting the housing to a stationary member or a load.

\* \* \* \* \*